US012590506B1

(12) United States Patent       (10) Patent No.:    US 12,590,506 B1
Mahmoud et al.                      (45) Date of Patent:       Mar. 31, 2026

(54) PROCESS FOR CEMENTING A PORTION OF A WELLBORE USING A RED MUD CEMENT COMPOSITION

(71) Applicant: King Fahd University of Petroleum and Minerals, Dhahran (SA)

(72) Inventors: Ahmed Abdulhamid Ahmed Mahmoud, Dhahran (SA); Salaheldin Mahmoud Ahmed Ahmed Elkatatny, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/051,298

(22) Filed: Feb. 12, 2025

(51) Int. Cl.
*E21B 33/13*       (2006.01)
*C09K 8/487*       (2006.01)

(52) U.S. Cl.
CPC .............. *E21B 33/13* (2013.01); *C09K 8/487* (2013.01)

(58) Field of Classification Search
CPC ................................ E21B 33/13; C09K 8/487
See application file for complete search history.

(56) References Cited

U.S. PATENT DOCUMENTS

| | | | |
|---|---|---|---|
| 2017/0306211 A1* | 10/2017 | Pisklak | ................... E21B 33/14 |
| 2017/0342786 A1* | 11/2017 | Pisklak | .................. C09K 8/601 |

FOREIGN PATENT DOCUMENTS

| | | |
|---|---|---|
| CN | 103011758 A | 4/2013 |
| CN | 103496862 B | 5/2015 |
| CN | 108264276 A | 7/2018 |
| CN | 111995269 B | 3/2022 |
| SU | 1728172 A1 | 4/1992 |

OTHER PUBLICATIONS

Mansour Ghalehnovi, et al., "Self-compacting architectural concrete production using red mud", Construction and Building Materials, vol. 226, Nov. 30, 2019, pp. 418-427, 6 pages.
Jeetika Patangia, et al., "Study on the utilization of red mud (bauxite waste) as a supplementary cementitious material: Pathway to attaining sustainable development goals", Construction and Building Materials, vol. 375, Apr. 24, 2023, 131005, 6 pages.

* cited by examiner

*Primary Examiner* — Crystal J Lee
(74) *Attorney, Agent, or Firm* — Oblon, McClelland, Maier & Neustadt, L.L.P.

(57)       ABSTRACT
A method of cementing a portion of a wellbore involving introducing a well cement slurry into the portion of the wellbore and allowing the well cement slurry to cure, thereby forming a cured wellbore cement sheath. The well cement slurry includes a hydraulic cement, red mud which is present in an amount of 2.5% to 50% by weight of cement (% BWOC), a viscosifier, a fluid loss additive, and water.

20 Claims, 6 Drawing Sheets

10%
RM

15%
RM

20%
RM

25%
RM 1204 psi        1653 psi        1697 psi        1813 psi 1204
psi 1653
psi 1697
psi 1813
psi

PROCESS FOR CEMENTING A PORTION OF A WELLBORE USING A RED MUD CEMENT COMPOSITION

CROSS-REFERENCE TO RELATED APPLICATION

The present disclosure claims the benefit of Saudi patent Application No. 1020250709, filed on Feb. 3, 2025, with the Saudi Authority for Intellectual Property Office, which is incorporated herein by reference in its entirety.

STATEMENT OF PRIOR DISCLOSURE BY AN INVENTOR

Aspects of the present disclosure are described in Ahmed Abdulhamid Mahmoud and Salaheldin Elkatatny, "Turning Waste into Resource: Red Mud as a Sustainable Alternative to Class G Cement in Surface Casing Cementing", Available at SSRN Abstract No. 4910224, Jul. 30, 2024; Ahmed Abdulhamid Mahmoud, Abdulmalek Ahmed, Ahmed Alsabaa, and Salaheldin Elkatatny, "Partial Replacement of Saudi Class G Cement with Red Mud for 15.8 ppg Cement Slurries", presented at the 58th U.S. Rock Mechanics/ Geomechanics Symposium, Golden, Colorado, USA, June 2024; A. A. Mahmoud, & S. Elkatatny, "Optimizing Red Mud/Class G Cement Mixture for Lightweight Cement Slurries", presented at the 58th U.S. Rock Mechanics/ Geomechanics Symposium, Jun. 23-26, 2024; A. A. Mahmoud, & S. Elkatatny, "Innovative Redefinition of Well Cementing Utilizing Red Mud", presented at the SPE Annual Technical Conference and Exhibition, New Orleans, Louisiana, USA, Sep. 23-25, 2024; and A. A. Mahmoud, & S. Elkatatny, "Using Red Mud to Achieve Sustainable Well Cement with Balanced Performance and Eco-Friendliness", presented at the ADIPEC, Abu Dhabi, UAE, November 2024, each of which is incorporated herein by reference in its entirety.

BACKGROUND

Technical Field

The present disclosure is directed towards oil well cement formulations and, more particularly, relates to a method of cementing a wellbore by partial inclusion of red mud.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Cementing is a vital phase in oil well construction. Cementing involves placement of cement slurries to create a barrier between the wellbore and the surrounding geological formations as well as between different casing strings. Cementing provides zonal isolation as well as prevents fluid migration, maintains wellbore stability, and contributes to the overall stability and integrity essential for successful and sustainable oil well operations. Optimizing oil well cement properties is crucial for achieving the desired objectives during oil well drilling and completion processes. The specific requirements for zonal isolation, mechanical strength, and resistance to downhole conditions necessitate a tailored approach in designing cement formulations [Gupta, B. K., Dange, M., Fortner, K., Kumar, A., Ten years of successful tailored cement design and execution in HP/HT wells in Indian offshore drilling projects: Case Study, presented at the Offshore Technology Conference Asia, Kuala Lumpur, Malaysia, November 2020]. The optimization can involve adjusting parameters such as cement composition, particle size distribution, and water-cement ratio to enhance the performance of the cement in the specific well environment. Achieving the right balance is essential to ensuring long-term oil well integrity, preventing issues like gas migration, casing corrosion, and cement degradation.

The utilization of complementary additives, specifically industrial waste materials and byproducts, has emerged as a sustainable and economically effective strategy for optimizing cement properties. Incorporating materials like fly ash, slag, silica fume, olive waste and other supplementary cementitious materials may enhance the mechanical and rheological properties of the cement and further may address environmental concerns associated with waste disposal [Ahmed, A., Mahmoud, A. A., Elkatatny, S., and Al-Majed, A., "Evaluation of granite waste and silica flour in oil well cementing" presented at the 55th U.S. Rock Mechanics/ Geomechanics Symposium, Virtual, June 2021; and Ali, A., Mahmoud, A. A., Al Ramadan, M., Elkatatny, S., "The effect of olive waste on the rheological properties, thickening time, permeability, and strength of oil well cement", ACS Omega, 2023, 8, 33, 30139-30144]. These additives can contribute to the durability, resistance to chemical attacks, and overall performance of the cement, making the additives valuable components in the quest for efficient and environmentally conscious oil well cement formulations. Using such additives may be advantageous for making oilwell cementing operations more sustainable and eco-friendly and for maintaining and further improving the technical aspects of oil well cement. However, certain additives lack specific features that may be beneficial for cementing wellbores at low concentrations of cement to additive mixture. Further, only a relatively small amount of potentially useful industrial wastes have been investigated. Additionally, even for industrial wastes that have been investigated, there are many unexplored applications and environments to be studied.

One potentially useful industrial waste is red mud, which is a byproduct of aluminum mining and refining. In general, about 35% to 65% of the processed bauxite is converted to an alkaline red mud waste. Red mud typically includes alumina, iron oxide (hematite), and some toxic heavy metals. Red mud and other wastes material like fly ash, silica fume, and rice husk ash pose serious threat to environment and may contribute towards alarming level of soil pollution. Hence, there arises a requirement for better utilization and elimination of aforementioned waste products, and improvement of cement mixture for oil wellbores.

Accordingly, one object of the present disclosure is to provide a method of cementing a wellbore, utilizing industrial waste products. The method as described herein aims to circumvent the drawbacks and limitations, such as, low durability, high operational costs, and low waste elimination, of methods and materials known in the art.

SUMMARY

According to a first aspect, the present disclosure relates to a method of cementing a portion of a wellbore. In some embodiments, the method includes introducing a well cement slurry into the portion of the wellbore. In some embodiments, the well cement slurry includes a hydraulic cement, red mud which is present in an amount of 2.5% to 50% by weight of the hydraulic cement (% BWOC), a viscosifier, a fluid loss additive, and water. In some embodiments, the method involves allowing the well cement slurry to cure, thereby forming a cured wellbore cement sheath.

In some embodiments, the red mud includes 19 percent by weight (wt. %) to 51 wt. % iron oxide, 15 wt. % to 30 wt. % aluminum oxide, 4 wt. % to 20 wt. % silica, titanium dioxide, calcium oxide, and sodium oxide.

In some embodiments, the red mud is present in the well cement slurry in an amount of 5% BWOC to 30% BWOC.

In some embodiments, the red mud is present in the well cement slurry in an amount of 12.5% BWOC to 17.5% BWOC.

In some embodiments, the red mud has an average particle size ($D_{50}$) of 1 micrometer ($\mu$m) to 7.5 $\mu$m.

In some embodiments, the red mud has a particle size distribution having a first modal size of 5 $\mu$m to 10 $\mu$m and a second modal size of 15 $\mu$m to 25 $\mu$m.

In some embodiments, the viscosifier is present in the well cement slurry in an amount of 0.05% BWOC to 1.0% BWOC.

In some embodiments, the viscosifier is present in the well cement slurry in an amount of 0.1% BWOC to 0.15% BWOC.

In some embodiments, the fluid loss additive is present in the well cement slurry in an amount of 0.05% to 1.0% BWOC.

In some embodiments, the fluid loss additive is present in the well cement slurry in an amount of 0.25% BWOC to 75% BWOC.

In some embodiments, the hydraulic cement is selected from the group consisting of an API class A Portland cement, an API class G Portland cement, an API class H Portland cement, and a Saudi class G hydraulic cement.

In some embodiments, the hydraulic cement is Saudi class G cement.

In some embodiments, the well cement slurry has a density of 95 pounds per cubic foot (lb/ft$^3$) to 120 lb/ft$^3$.

In some embodiments, the well cement slurry has a fluid loss of 10 mL to 400 mL per 30 minutes, and a plastic viscosity of 30 centipoise (cP) to 60 cP.

In some embodiments, the well cement slurry has a 10-second gel strength of 10 pound-force per 100 square feet (lb$_f$/100 ft$^2$) to 25 lb$_f$/100 ft$^2$, and a 10-minute gel strength of 15 lb$_f$/100 ft$^2$ to 35 lb$_f$/100 ft$^2$, each measured at 90 degrees Fahrenheit (° F.) to 120° F.

In some embodiments, the cured wellbore cement sheath has a compressive strength in cured form of 1100 pounds per square inch (psi) to 1900 psi.

In some embodiments, the wellbore has a temperature in a range of 50° C. to 300° C., and a pressure of 0.1 megapascal (MPa) to 20 MPa.

In some embodiments, the well cement slurry is applied to a surface of the wellbore to form a cured wellbore cement sheath covering a subterranean geological formation.

In some embodiments, the wellbore is at least one selected from the group consisting of a horizontal wellbore, a vertical wellbore, and a multi-lateral wellbore.

In some embodiments, the wellbore is at least one selected from the group consisting of a geothermal wellbore, an oil wellbore, a natural gas wellbore, a gas injection wellbore, a water injection wellbore, and an aquifer production wellbore.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
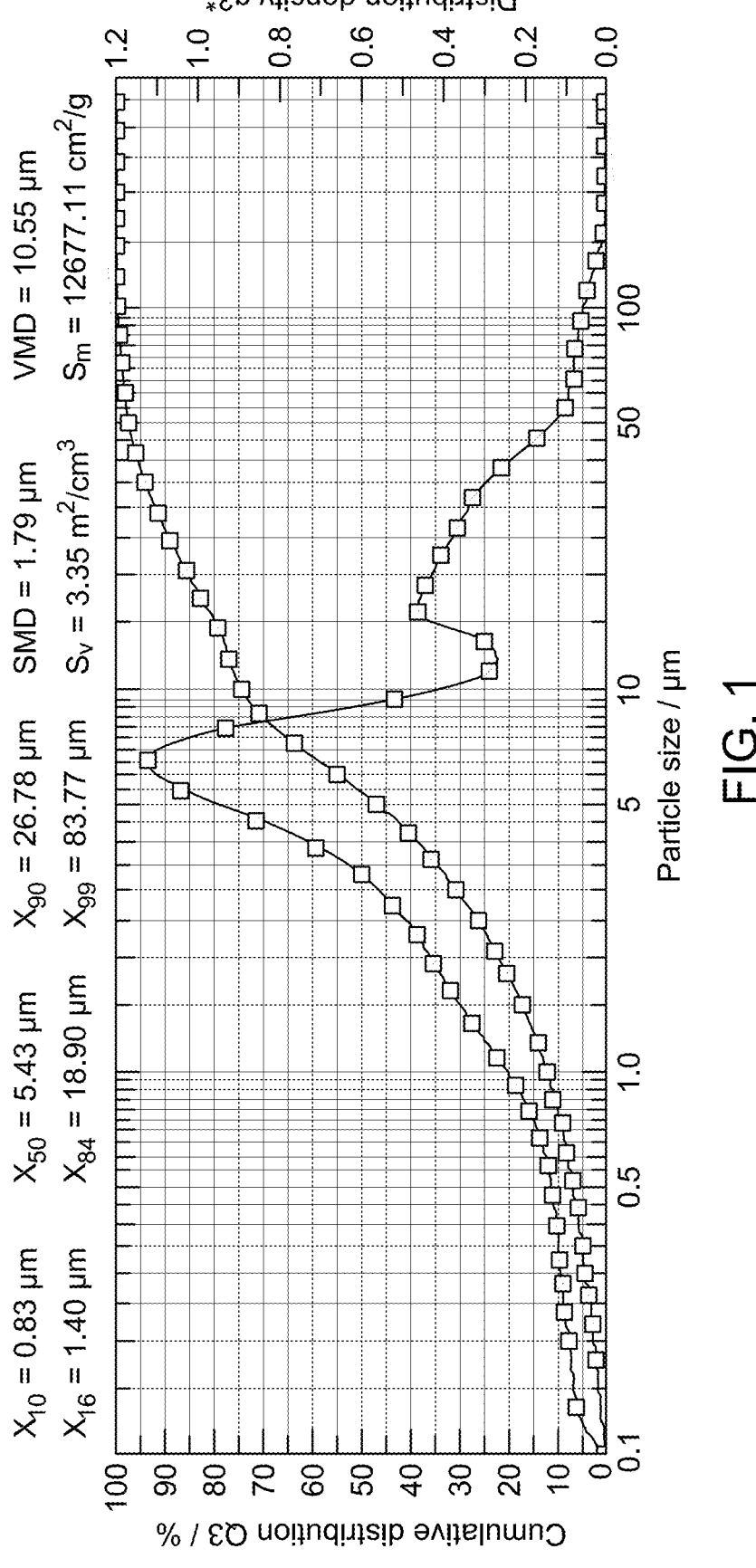
FIG. 1 is a graph depicting a particle size distribution for a red mud used in cement slurries, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "wellbore" refers to a process involving the drilling or boring of a hole into the earth's subsurface for the purpose of accessing, extracting, or injecting fluids, gases, or other materials and such a hole formed by the process. This may include the construction of vertical, horizontal, deviated, or multi-lateral holes, typically designed for oil and gas extraction, water or gas injection, geothermal energy production, or other subsurface operations. Wellbores are essential in the exploration and production of natural resources, as well as in monitoring, pressure control, and other specialized subsurface activities.

As used herein, the term "well cement slurry" refers to a process of combining various ingredients, typically including hydraulic cement, water, and sometimes admixtures, to form a homogenous slurry that can be cast into molds and hardened into a solid structure. The process may also include additional materials such as viscosifiers, fluid loss additives, or other specialty additives to enhance specific properties of the cement slurry and the solidified sheath, such as strength, durability, workability, or resistance to environmental factors. The resulting well cement slurry is used for wellbore cementing.

As used herein, the term "hydraulic cement" refers to a type of cement that, when mixed with water, undergoes a chemical reaction known as hydration, forming a hardened material that is resistant to water and capable of setting and curing even under water or in moist conditions. This process typically involves a reaction between the cement's primary components, such as calcium silicates, aluminates, and ferrites, with water to form calcium silicate hydrate (C—S—H) gel, which gives the cement its strength and durability. Hydraulic cement is commonly used in wellbore casings cementing. Hydraulic cements, for instance, can include Portland cements, aluminous cements, pozzolan cements, fly ash cements, and the like. Thus, for example, any of the oil well type cements of the class "A-H" as listed in the API Spec 10, (1st ed., 1982), are suitable hydraulic cements. Typically, hydraulic cements, particularly oil well type cements of the class "A-H", are used to cement the well casing within the wellbore. Hydraulic cements set and develop compressive strength due to the occurrence of a hydration reaction which allows them to set or cure under water. The physical properties of the set cement relate to the crystalline structure of the calcium-silicate-hydrates formed during hydration. For example, oil well type cements of the class "A-H" form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency. Hydration products of oil well type cements of the class "A-H" may also form crystalline or amorphous interlocking networks of the hydration products calcium silicate hydrate (CSH, or C—S—H), calcium hydroxide (CH, or Portlandite), calcium silicate (Larnite), aluminum calcium iron oxide (such as $Ca_2FeAlO_5$), and/or silicon dioxide.

As used herein, the term "red mud" refers to a process byproduct generated during the extraction of alumina from bauxite ore in the Bayer process. Red mud is typically highly alkaline, typically reddish-brown, and typically contains a mixture of various compounds, including iron oxides, aluminum oxides, silica, and trace amounts of other metals. The extraction processes that generate red mud typically involve the use of caustic soda to separate alumina from bauxite, resulting in the creation of red mud as a waste product. Red mud is typically discarded, though it has been explored for various uses, such as a potential material for soil stabilization or as a component in other industrial processes, due to its chemical composition and mineral content.

As used herein, the term "viscosifier" refers to a process or additive used to increase the viscosity of a fluid or mixture. In the context of wellbore cementing, a viscosifier is typically added to control the flow properties of the slurry, improving its ability to suspend solids, reduce fluid loss, and enhance workability. This process involves the addition of materials such as clays, polymers, or other thickening agents that, when mixed with a liquid, increase its resistance to flow. Viscosifiers are commonly used in cement slurries, drilling fluids, and other fluid-based applications to ensure that the mixture maintains the desired consistency and performance under varying conditions.

As used herein, the term "fluid loss additive" refers to a process or chemical compound added to a fluid mixture, such as a cement slurry or drilling fluid, to reduce the loss of the liquid phase to the surrounding formation during application. Fluid loss additives work by forming a thin, impermeable filter cake on the surface of the wellbore or other porous materials, which helps to prevent excessive fluid seepage and minimizes the risk of formation damage. This process improves the efficiency of cementing operations, enhances the stability of the slurry, and ensures better bonding between the cement and the wellbore. Fluid loss additives are particularly important in wellbore cementing, where maintaining the integrity of the mixture is crucial for sealing and securing the well.

As used herein, the term "BWOC" refers to a process or unit of measurement that stands for "By Weight of Cement." It is used to describe the proportion or concentration of an additive, material, or component in a mixture relative to the weight of the hydraulic cement used in the formulation. This process is commonly applied in the preparation of well cement slurries, where the amount of an ingredient (such as a viscosifier, fluid loss additive, or red mud) is specified as a percentage of the total cement weight. The BWOC measurement ensures accurate control of material proportions, enabling the desired properties of the mixture to be achieved. BWOC is typically calculated and/or reported as dry weight (i.e., excluding water). BWOC is also typically calculated per ingredient or component based on the weight of cement. As used herein, the term BWOC is calculated based on a weight of the cement used. For example, when a hydraulic cement is used, BWOC can be calculated based on a weight of the hydraulic cement. When a mixture of a hydraulic cement and a non-hydraulic cement is used, BWOC can be calculated based on a total weight of the hydraulic cement and non-hydraulic cement.

As used herein, the term "average particle size" refers to a process or measurement that describes the typical size of particles in a given material, often represented as the mean diameter of the particles in a sample. This process is commonly determined using methods such as laser diffraction, sieve analysis, or dynamic light scattering, which analyze the distribution of particle sizes within a sample. In the context of wellbore cementing, the average particle size is important for influencing the material's flow properties, workability, and overall performance. A smaller average particle size typically enhances the packing density and the reactivity of the material, while a larger particle size may affect the slurry's consistency and its ability to suspend solids.

As used herein, the term "plastic viscosity" refers to a process or measurement that describes the resistance of a fluid to flow under applied stress, specifically within the context of non-Newtonian fluids, such as cement slurries or drilling fluids. Plastic viscosity is a key parameter in determining how easily a fluid can be pumped or moved, and it reflects the internal friction of the fluid as it flows. The process of measuring plastic viscosity typically involves rheological testing, where a fluid's flow behavior is analyzed to determine its viscosity under varying shear rates. In wellbore cementing applications, controlling plastic viscosity is important to optimize the workability, pumpability, and ability to suspend solids in the fluid mixture.

As used herein, the term "10-second gel strength" refers to a process or measurement that quantifies the ability of a fluid, such as a cement slurry or drilling fluid, to resist flow or deformation after a specified period of time, specifically 10 seconds, following the cessation of shear stress. This process is used to assess the fluid's initial gelation or thickening properties. The 10-second gel strength is an important parameter in evaluating the fluid's ability to suspend particles (such as cement particles or additives) and prevent settling during placement, especially in wellbore applications. A higher gel strength indicates that the fluid has a stronger resistance to flow, which is important for maintaining the integrity of the mixture before it sets.

As used herein, the term "10-minute gel strength" refers to a process or measurement that quantifies the ability of a fluid, such as a cement slurry or drilling fluid, to resist flow or deformation after a specified period of time, specifically 10 minutes, following the cessation of shear stress. This process is used to evaluate the fluid's gelation or thickening properties over a longer duration, typically after it has begun to set. The 10-minute gel strength is an important parameter in assessing the fluid's ability to suspend solids and prevent settling over time, particularly in wellbore applications. A higher 10-minute gel strength indicates that the fluid has developed a more substantial resistance to flow, which is important for maintaining the desired consistency and preventing the separation of components during placement and early stages of curing. Typically, the gel strength (10-minmute gel strength and 10-second gel strength) are measured according to API 13D "Recommended Practice on the Rheology and Hydraulics of Oil-Well Drilling Fluids" published by the American Petroleum Institute, 5th Edition published Jun. 1, 2006, which is incorporated herein by reference in its entirety.

According to a first aspect, the present disclosure relates to a method of cementing a portion of a wellbore. Cementing a portion of a wellbore is advantageous for, among other things, providing structural integrity, sealing the annular space, and preventing fluid migration between geological formations. Cementing can be advantageous for ensuring well stability, minimizing the risk of blowouts, and enabling proper zonal isolation during drilling and production operations.

In some embodiments, the method includes introducing into the portion of the wellbore a well cement slurry and allowing the well cement slurry to cure thereby forming a cured wellbore cement sheath. In some embodiments, the wellbore cement slurry includes a cement. In some embodiments, the cement is a hydraulic cement. In some embodiments, the well cement slurry includes a red mud. In some embodiments, the well cement slurry includes any of a viscosifier, a fluid loss additive, a dispersion agent, an expandable agent, and water.

The well cement slurry may be used in wellbore cementing operations such as primary cementing where strings of pipe (e.g. casings and liners) are cemented in wellbores, e.g., to form a cased wellbore. In some embodiments, the well cement slurry (e.g., in the form of a wet cement slurry) is introduced into and cured within an annulus existing between a pipe and a formation of a wellbore, thus producing a cured cement material (i.e. wellbore cement) between the pipe and the formation of the wellbore. The wellbore cement may physically support and position the pipe within the wellbore and prevent undesirable migration of fluids between formations of the wellbore.

In some embodiments, the cement used herein may include hydraulic cement, non-hydraulic cement, or a combination thereof. In some embodiments, the cement is hydraulic cement. The cement may comprise Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard).

Additional cement types include hydraulic cements, Saudi Class G hydraulic cement, non-hydraulic cements, Portland fly ash cement, Portland Pozzolan cement, Portland silica fume cement, masonry cements, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar.

In some embodiments, the hydraulic cement is at least one selected from the group consisting of an API Class A Portland cement, an API Class G Portland cement, an API Class H Portland cement, a Saudi Class G hydraulic cement, an API Class C Portland cement, an API Class F Portland cement, an API Class E Portland cement, a Type I Portland cement, a Type II Portland cement, a Type III Portland cement, a Type IV Portland cement, a Type V Portland cement, an ASTM C150 Type I cement, an ASTM C150 Type II cement, an ASTM C150 Type III cement, an ASTM C150 Type V cement, an ASTM C595 Type IS cement, an ASTM C595 Type IP cement, an ASTM C595 Type IL cement, a slag cement, a blended cement, a high-early-strength cement, a low-heat cement, an oil-well cement, a sulfate-resistant cement, a white Portland cement, a rapid-hardening cement, a masonry cement, a hydraulic lime, a Portland-limestone cement, and a volcanic ash cement. In some embodiments, the hydraulic cement is Saudi Class G cement.

In some embodiments, the red mud includes iron oxide. In some embodiments, the red mud includes iron oxide in a range of 19 to 51 wt. %, based on a total weight of red mud. For example, the red mud can include iron oxide at 19.0 wt. %, 19.5 wt. %, 20.0 wt. %, 20.5 wt. %, 21.0 wt. %, 21.5 wt. %, 22.0 wt. %, 22.5 wt. %, 23.0 wt. %, 23.5 wt. %, 24.0 wt. %, 24.5 wt. %, 25.0 wt. %, 25.5 wt. %, 26.0 wt. %, 26.5 wt. %, 27.0 wt. %, 27.5 wt. %, 28.0 wt. %, 28.5 wt. %, 29.0 wt. %, 29.5 wt. %, 30.0 wt. %, 30.5 wt. %, 31.0 wt. %, 31.5 wt. %, 32.0 wt. %, 32.5 wt. %, 33.0 wt. %, 33.5 wt. %, 34.0 wt. %, 34.5 wt. %, 35.0 wt. %, 35.5 wt. %, 36.0 wt. %, 36.5 wt. %, 37.0 wt. %, 37.5 wt. %, 38.0 wt. %, 38.5 wt. %, 39.0 wt. %, 39.5 wt. %, 40.0 wt. %, 40.5 wt. %, 41.0 wt. %, 41.5 wt. %, 42.0 wt. %, 42.5 wt. %, 43.0 wt. %, 43.5 wt. %, 44.0 wt. %, 44.5 wt. %, 45.0 wt. %, 45.5 wt. %, 46.0 wt. %, 46.5 wt. %, 47.0 wt. %, 47.5 wt. %, 48.0 wt. %, 48.5 wt. %, 49.0 wt. %, 49.5 wt. %, 50.0 wt. %, 50.5 wt. %, or 51.0 wt. %, based on a total weight of red mud. In some embodiments, the red mud includes 30.7 wt. % iron oxide, based on a total weight of red mud.

In some embodiments, the red mud includes aluminum oxide. In some embodiments, the red mud includes aluminum oxide in a range of 15 to 30 wt. %, based on a total weight of red mud. For example, the red mud can include aluminum oxide at 16.0 wt. %, 16.5 wt. %, 17.0 wt. %, 17.5 wt. %, 18.0 wt. %, 18.5 wt. %, 19.0 wt. %, 19.5 wt. %, 20.0 wt. %, 20.5 wt. %, 21.0 wt. %, 21.5 wt. %, 22.0 wt. %, 22.5 wt. %, 23.0 wt. %, 23.5 wt. %, 24.0 wt. %, 24.5 wt. %, 25.0 wt. %, 25.5 wt. %, 26.0 wt. %, 26.5 wt. %, 27.0 wt. %, 27.5 wt. %, 28.0 wt. %, 28.5 wt. %, 29.0 wt. %, 29.5 wt. %, or 30.0 wt. %, based on a total weight of red mud. In some embodiments, the red mud includes aluminum oxide in the range of 25.6 wt. %, based on a total weight of red mud.

In some embodiments, the red mud includes silica. In some embodiments, the red mud includes silica in a range of 4 to 20 wt. %, based on a total weight of red mud. For example, the red mud can include silica at 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, 10.0 wt. %, 10.25 wt. %, 10.5 wt. %, 10.75 wt. %, 11.0 wt. %, 11.25 wt. %, 11.5 wt. %, 11.75 wt. %, 12.0 wt. %, 12.25 wt. %, 12.5 wt. %, 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt. %, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, or 20.0 wt. %, based on a total weight of red mud. In some embodiments, the red mud includes 15.2 wt. % silica, based on a total weight of red mud.

In some embodiments, the red mud includes titanium dioxide. In some embodiments, the red mud includes titanium dioxide in a range of 4 to 20 wt. %, based on a total weight of red mud. For example, the red mud can include titanium dioxide at 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, 10.0 wt. %, 10.25 wt. %, 10.5 wt. %, 10.75 wt. %, 11.0 wt. %, 11.25 wt. %, 11.5 wt. %, 11.75 wt. %, 12.0 wt. %, 12.25 wt. %, 12.5 wt. %, 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt. %, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, or 20.0 wt. %, based on a total weight of red mud. In some embodiments, the red mud includes 6.9 wt. % of titanium dioxide, based on a total weight of red mud.

In some embodiments, the red mud includes calcium oxide. In some embodiments, the red mud includes calcium oxide in a range of 4 to 20 wt. %, based on a total weight of red mud. For example, the red mud can include calcium oxide at 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, 10.0 wt. %, 10.25 wt. %, 10.5 wt. %, 10.75 wt. %, 11.0 wt. %, 11.25 wt. %, 11.5 wt. %, 11.75 wt. %, 12.0 wt. %, 12.25 wt. %, 12.5 wt. %, 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt. %, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, or 20.0 wt. %, based on a total weight of red mud. In some embodiments, the red mud includes 5.6 wt. % of calcium oxide, based on a total weight of red mud.

In some embodiments, the red mud includes sodium oxide. In some embodiments, the red mud includes sodium oxide in a range of 4 to 20 wt. %, based on a total weight of red mud. For example, the red mud can include sodium oxide at 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, 10.0 wt. %, 10.25 wt. %, 10.5 wt. %, 10.75 wt. %, 11.0 wt. %, 11.25 wt. %, 11.5 wt. %, 11.75 wt. %, 12.0 wt. %, 12.25 wt. %, 12.5 wt. %, 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt. %, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, or 20.0 wt. %, based on a total weight of red mud. In some embodiments, the red mud includes 13.6 wt. % sodium oxide, based on a total weight of red mud.

In some embodiments, the red mud is present in the well cement slurry in an amount ranging from 5 to 30% BWOC. For example, the red mud may be present at 5.0% BWOC, 7.5% BWOC, 8.0% BWOC, 8.5% BWOC, 9.0% BWOC, 9.5% BWOC, 10.0% BWOC, 10.5% BWOC, 11.0% BWOC, 11.5% BWOC, 12.0% BWOC, 12.5% BWOC, 13.0% BWOC, 13.5% BWOC, 14.0% BWOC, 14.5% BWOC, 15.0% BWOC, 15.5% BWOC, 16.0% BWOC, 16.5% BWOC, 17.0% BWOC, 17.5% BWOC, 18.0% BWOC, 18.5% BWOC, 19.0% BWOC, 19.5% BWOC, 20.0% BWOC, 20.5% BWOC, 21.0% BWOC, 21.5% BWOC, 22.0% BWOC, 22.5% BWOC, 23.0% BWOC, 23.25% BWOC, 24.0% BWOC, 24.5% BWOC, 25.0% BWOC, 25.5% BWOC, 26.0% BWOC, 26.5% BWOC, 27.0% BWOC, 27.5% BWOC, 28.0% BWOC, 28.5% BWOC, 29.0% BWOC, 29.5% BWOC, or 30.0% BWOC. In some embodiments, the red mud is present in the well cement slurry in an amount of 15% BWOC.

In some embodiments, the red mud is present as or comprises particles. In general, the red mud particles can be any shape known to one of ordinary skill in the art. Examples of suitable shapes the red mud particles may take include spheres, spheroids, lentoids, ovoids, solid polyhedra such as tetrahedra, cubes, octahedra, icosahedra, dodecahedra, hollow polyhedra (also known as nanocages or microcages), stellated polyhedra (both regular and irregular, also known as nanostars or microstars), triangular prisms (also known as nanotriangles), hollow spherical shells (also known as nanoshells or microshells), tubes (also known as nanotubes or microtubes), nanosheets, microsheets, nanoplatelets, microplatelets, nanodisks, microdisks, rods (also known as nanorods or microrods), and mixtures thereof. In the case of nanorods or microrods, the rod shape may be defined by a ratio of a rod length to a rod width, the ratio being known as the aspect ratio. For red mud particles of the current invention, nanorods or microrods should have an aspect ratio less than 1000, preferably less than 750, preferably less than 500, preferably less than 250, preferably less than 100, preferably less than 75, preferably less than 50, preferably less than 25.

In some embodiments, the red mud particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of red mud particles having a different shape. As used herein, the term "non-uniform shape" refers to an average consistent shape that differs by more than 10% of the distribution of red mud particles having a different shape. In one embodiment, the shape is uniform and at least 90% of the red mud particles are spherical or substantially circular, and less than 10% are polygonal. In another embodiment, the shape is non-uniform and less than 90% of the red mud particles are spherical or substantially circular, and greater than 10% are polygonal.

In some embodiments, the red mud has an average particle size (D50) ranging from 1 to 7.5 μm. For example, the red mud may have an average particle size of 1.0 μm, 1.25 μm, 1.5 μm, 1.75 μm, 2.0 μm, 2.25 μm, 2.5 μm, 2.75 μm, 3.0 μm, 3.25 μm, 3.5 μm, 3.75 μm, 4.0 μm, 4.25 μm, 4.5 μm, 4.75 μm, 5.0 μm, 5.25 μm, 5.5 μm, 5.75 μm, 6.0 μm, 6.25 μm, 6.5 μm, 6.75 μm, 7.0 μm, 7.25 μm, or 7.5 μm. In some embodiments, the red mud has an average particle size (D50) of 4.53 μm.

In some embodiments, the red mud has a particle size distribution having a first modal size of ranging from 5 to 10 μm. For example, the red mud may have a particle size distribution having a first modal size of 5.25μ, 5.5 μm, 5.75 μm, 6.0 μm, 6.25 μm, 6.5 μm, 6.75 μm, 7.0 μm, 7.25 μm, 7.5 μm, 7.75 μm, 8.0 μm, 8.25 μm, 8.5 μm, 8.75 μm, 9.0 μm, 9.25 μm, 9.5 μm, 9.75 μm, or 10.0 μm. In some embodiments, the first modal size distribution is 5.43 μm.

In some embodiments, the red mud has a particle size distribution having a second modal size of ranging from 15 to 25 μm. For example, the red mud may have a particle size distribution having a second modal size of 15.0 μm, 15.25 μm, 15.5 μm, 15.75 μm, 16.0 μm, 16.25 μm, 16.5 μm, 16.75 μm, 17.0 μm, 17.25 μm, 17.5 μm, 17.75 μm, 18.0 μm, 18.25 μm, 18.5 μm, 18.75 μm, 19.0 μm, 19.25 μm, 19.5 μm, 19.75 μm, 20.0 μm, 20.25 μm, 20.5 μm, 20.75 μm, 21.0 μm, 21.25 μm, 21.5 μm, 21.75 μm, 22.0 μm, 22.25 μm, 22.5 μm, 22.75 μm, 23.0 μm, 23.25 μm, 23.5 μm, 23.75 μm, 24.0 μm, 24.25 μm, 24.5 μm, 24.75 μm, or 25.0 μm. In some embodiments, the second modal size distribution is 18.90 μm.

In embodiments where the red mud particles are spherical, the particle size may refer to a particle diameter. In embodiments where the red mud particles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the red mud particles have an anisotropic shape such as nanorods, the particle size may refer to a length of the nanorod, a width of the nanorod, or an average of the length and width of the nanorod. In some embodiments in which the red mud particles have non-spherical shapes, the particle size refers to the diameter of a sphere having an equivalent volume as the particle. In some embodiments in which the red mud particles have non-spherical shapes, the particle size refers to the diameter of a sphere having an equivalent diffusion coefficient as the particle.

In some embodiments, the red mud particles of the present disclosure are monodisperse, having a coefficient of variation or relative standard deviation, expressed as a percentage and defined as the ratio of the particle size standard deviation (o) to the particle size mean (u) multiplied by 100 of less than 25%, preferably less than 10%, preferably less than 8%, preferably less than 6%, preferably less than 5%, preferably less than 4%, preferably less than 3%, preferably less than 2%. In some embodiments, the red mud particles of the present disclosure are monodisperse having a particle size distribution ranging from 80% of the average particle size to 120% of the average particle size, preferably 90-110%, preferably 95-105% of the average particle size. In some embodiments, the red mud particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the well cement slurry comprises a viscosifier. In some embodiments, the viscosifier is present in the well cement slurry in an amount ranging from 0.05 to 1.0% BWOC. For example, the viscosifier may be present in an amount of 0.05% BWOC, 0.10% BWOC, 0.15% BWOC, 0.20% BWOC, 0.25% BWOC, 0.30% BWOC, 0.35% BWOC, 0.40% BWOC, 0.45% BWOC, 0.50% BWOC, 0.55% BWOC, 0.60% BWOC, 0.65% BWOC, 0.70% BWOC, 0.75% BWOC, 0.80% BWOC, 0.85% BWOC, 0.90% BWOC, 0.95% BWOC, or 1.00% BWOC. In some embodiments, the viscosifier is present in the well cement slurry in an amount of 0.12% BWOC.

In some embodiments, the well cement slurry comprises a fluid loss additive. In some embodiments, the fluid loss additive is present in the well cement slurry in an amount ranging from 0.05 to 1.0% BWOC. For example, the fluid loss additive may be present in an amount of 0.05% BWOC, 0.10% BWOC, 0.15% BWOC, 0.20% BWOC, 0.25% BWOC, 0.30% BWOC, 0.35% BWOC, 0.40% BWOC, 0.45% BWOC, 0.50% BWOC, 0.55% BWOC, 0.60% BWOC, 0.65% BWOC, 0.70% BWOC, 0.75% BWOC, 0.80% BWOC, 0.85% BWOC, 0.90% BWOC, 0.95% BWOC, or 1.00% BWOC. In some embodiments, the fluid loss additive is present in the well cement slurry in an amount of 0.5% BWOC. Controlling fluid loss rate is an important issue to be considered when cementing across permeable formations, where it could be damaged by the cement slurry filtrate. Exemplary fluid loss additives include, but are not limited to, guar gums and derivatives, welan gum, xanthan gum, poly(ethyleneimine), AMPS polymer (i.e. poly (2-acrylamido-2-methyl-1-propanesulfonic acid), cellulose and derivatives such as carboxymethyl hydroxyethyl cellulose, carboxymethyl cellulose, and hydroxyethyl cellulose, and polystyrene sulfonate.

In some embodiments, the well cement slurry comprises a dispersion agent. Dispersion agents, also known as friction reducers, dispersants, thinners, or turbulence inducers, are used mainly to control cement slurry rheological properties for better mixing and pumping. They may reduce friction between cement slurry particles, resulting in a lower pumping pressure requirement, and also reducing water-to-cement ratio, which may improve cement compressive strength. Exemplary dispersion agents include, but are not limited to, calcium lignosulfonate, sodium lignosulfonate, naphthalene sulfonates, polynaphthalenesulfonates, phenol sulfonates, phosphates, phosphonates, sulfonated styrene maleic anhydride, sulfonated styrene, maleimide, polyacrylates, polymethacrylates, and hydroxycarboxylic acids (e.g. citric acid). In some embodiments, the dispersion agent is present in an amount of 0.05 to 1.0% BWOC. For example, the dispersion agent may be present in an amount of 0.05% BWOC, 0.10% BWOC, 0.15% BWOC, 0.20% BWOC, 0.25% BWOC, 0.30% BWOC, 0.35% BWOC, 0.40% BWOC, 0.45% BWOC, 0.50% BWOC, 0.55% BWOC, 0.60% BWOC, 0.65% BWOC, 0.70% BWOC, 0.75% BWOC, 0.80% BWOC, 0.85% BWOC, 0.90% BWOC, 0.95% BWOC, or 1.00% BWOC. In some embodiments, the dispersion agent is present in the well cement slurry in an amount of 0.80% BWOC.

In some embodiments, the well cement slurry comprises an expandable agent. Conventional cement may shrink and cause cracks during the curing steps. Expandable agents, or expanding agent, may be used to promote cement bonding capability and help maintain cement sheath integrity. Exemplary expandable agents include, but are not limited to, sulphoaluminates such as UEA, calcium oxide, Halliburton's Microbond HT® Expanding Additive, and other expansion admixtures. In some embodiments, the expandable agent is present in an amount of 0.4% BWOC to 2% BWOC. For example, the expandable agent can be present in an amount of 0.4% BWOC, 0.5% BWOC, 0.6% BWOC, 0.7% BWOC, 0.8% BWOC, 0.9% BWOC, 1.0% BWOC, 1.1% BWOC, 1.2% BWOC, 1.3% BWOC, 1.4% BWOC, 1.5% BWOC, 1.6% BWOC, 1.7% BWOC, 1.8% BWOC, 1.9% BWOC, or 2.0% BWOC.

In some embodiments, the well cement slurry comprises a defoamer. Defoamers are anti-foaming agents used to minimize air entrainment (e.g. frothing, foaming) that often occurs during cement slurry mixing process. The entrapped air in the cement slurry may cause damages to the pumps in the field, and may also cause incorrect density of cement slurry. Exemplary defoamers include, but are not limited to, silicone based defoamers, polyethylene glycol and polypropylene glycol copolymers based defoamers, and oil-based defoamers, alkyl polyacrylates and polyether polymer. In some embodiments, the defoamer is present in an amount of $1 \times 10^{-8}$% BWOC to $1 \times 10^{-6}$% BWOC, preferably $5 \times 10^{-8}$% BWOC to $8 \times 10^{-7}$% BWOC, preferably $1 \times 10^{-7}$% BWOC to $6 \times 10^{-7}$% BWOC, preferably $2 \times 10^{-7}$% BWOC to $5 \times 10^{-7}$% BWOC, preferably $4.7 \times 10^{-7}$% BWOC.

In some embodiments, the well cement slurry has a water-to-cement weight ratio of 0.35 to 0.55. For example, the well cement slurry may have a water-to-cement weight ratio of 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, or 0.55. In general, the amount of water used in a wet cement slurry (well cement slurry) depends upon the type of hydraulic cement selected and the job conditions at hand. The amount of water used may vary over a wide range, depending upon factors such as the chemical identity of the cement and the required consistency of the wet cement slurry.

In some embodiments, the well cement slurry has a density ranging from 95 to 120 pounds per cubic foot (pcf). For example, the well cement slurry may have a density of 95.0 pcf, 95.5 pcf, 96.0 pcf, 96.5 pcf, 97.0 pcf, 97.5 pcf, 98.0 pcf, 98.5 pcf, 99.0 pcf, 99.5 pcf, 100.0 pcf, 100.5 pcf, 101.0 pcf, 101.5 pcf, 102.0 pcf, 102.5 pcf, 103.0 pcf, 103.5 pcf, 104.0 pcf, 104.5 pcf, 105.0 pcf, 105.5 pcf, 106.0 pcf, 106.5 pcf, 107.0 pcf, 107.5 pcf, 108.0 pcf, 108.5 pcf, 109.0 pcf, 109.5 pcf, 110.0 pcf, 110.5 pcf, 111.0 pcf, 111.5 pcf, 112.0 pcf, 112.5 pcf, 113.0 pcf, 113.5 pcf, 114.0 pcf, 114.5 pcf, 115.0 pcf, 115.5 pcf, 116.0 pcf, 116.5 pcf, 117.0 pcf, 117.5 pcf, 118.0 pcf, 118.5 pcf, 119.0 pcf, 119.5 pcf, or 120.0 pcf. In some embodiments, the well cement slurry has a density of 101 pounds per cubic foot (pcf).

In some embodiments, the well cement slurry has a fluid loss of 10 to 400 mL/30 min. For example, the well cement slurry may have a fluid loss of 10 mL/30 min, 15 mL/30 min, 20 mL/30 min, 25 mL/30 min, 30 mL/30 min, 35 mL/30 min, 40 mL/30 min, 45 mL/30 min, 50 mL/30 min, 55 mL/30 min, 60 mL/30 min, 65 mL/30 min, 70 mL/30 min, 75 mL/30 min, 80 mL/30 min, 85 mL/30 min, 90 mL/30 min, 95 mL/30 min, 100 mL/30 min, 105 mL/30 min, 110 mL/30 min, 115 mL/30 min, 120 mL/30 min, 125 mL/30 min, 130 mL/30 min, 135 mL/30 min, 140 mL/30 min, 145 mL/30 min, 150 mL/30 min, 155 mL/30 min, 160 mL/30 min, 165 mL/30 min, 170 mL/30 min, 175 mL/30 min, 180 mL/30 min, 185 mL/30 min, 190 mL/30 min, 195 mL/30 min, 200 mL/30 min, 205 mL/30 min, 210 mL/30 min, 215 mL/30 min, 220 mL/30 min, 225 mL/30 min, 230 mL/30 min, 235 mL/30 min, 240 mL/30 min, 245 mL/30 min, 250 mL/30 min, 255 mL/30 min, 260 mL/30 min, 265 mL/30 min, 270 mL/30 min, 275 mL/30 min, 280 mL/30 min, 285 mL/30 min, 290 mL/30 min, 295 mL/30 min, 300 mL/30 min, 305 mL/30 min, 310 mL/30 min, 315 mL/30 min, 320 mL/30 min, 325 mL/30 min, 330 mL/30 min, 335 mL/30 min, 340 mL/30 min, 345 mL/30 min, 350 mL/30 min, 355 mL/30 min, 360 mL/30 min, 365 mL/30 min, 370 mL/30 min, 375 mL/30 min, 380 mL/30 min, 385 mL/30 min, 390 mL/30 min, 395 mL/30 min, or 400 mL/30 min, 105 mL/30 min. In some embodiments, the well cement slurry has a fluid loss of 64 mL/30 min.

In some embodiments, the well cement slurry may further include a filler. Examples of fillers include, but are not limited to, fly ash, silica fume, ground granulated blast furnace slag, metakaolin, zeolite, perlite, vermiculite, pumice, diatomaceous earth, calcium carbonate, quartz powder, dolomite, titanium dioxide, aluminum oxide, iron oxide, gypsum, bentonite, kaolinite, attapulgite, montmorillonite, talc, wollastonite, basalt fibers, polypropylene fibers, carbon fibers, glass fibers, steel fibers, and polymeric beads.

In some embodiments, the well cement slurry has a plastic viscosity ranging from 30 to 60 cP. For example, the well cement slurry may have a plastic viscosity of 30 cP, 31 cP, 32 cP, 33 cP, 34 cP, 35 cP, 36 cP, 37 cP, 38 cP, 39 cP, 40 cP, 41 cP, 42 cP, 43 cP, 44 cP, 45 cP, 46 cP, 47 cP, 48 cP, 49 cP, 50 cP, 51 cP, 52 cP, 53 cP, 54 cP, 55 cP, 56 cP, 57 cP, 58 cP, 59 cP, or 60 cP. In some embodiments, the well cement slurry shows a plastic viscosity between 42 cP and 53 cP.

In some embodiments, the well cement slurry has a 10-second gel strength ranging from 10 to 25 $lb/100$ $ft^2$ when measured within the temperature range of 90 to 120° F. For example, the well cement slurry may have a 10-second gel strength of 10.0 $lb/100$ $ft^2$, 10.25 $lb/100$ $ft^2$, 10.5 $lb/100$ $ft^2$, 10.75 $lb/100$ $ft^2$, 11.0 $lb/100$ $ft^2$, 11.25 $lb/100$ $ft^2$, 11.5 $lb/100$ $ft^2$, 11.75 $lb/100$ $ft^2$, 12.0 $lb/100$ $ft^2$, 12.25 $lb/100$ $ft^2$, 12.5 $lb/100$ $ft^2$, 12.75 $lb/100$ $ft^2$, 13.0 $lb/100$ $ft^2$, 13.25 $lb/100$ $ft^2$, 13.5 $lb/100$ $ft^2$, 13.75 $lb/100$ $ft^2$, 14.0 $lb/100$ $ft^2$, 14.25 $lb/100$ $ft^2$, 14.5 $lb/100$ $ft^2$, 14.75 $lb/100$ $ft^2$, 15.0 $lb/100$ $ft^2$, 15.25 $lb/100$ $ft^2$, 15.5 $lb/100$ $ft^2$, 15.75 $lb/100$ $ft^2$, 16.0 $lb/100$ $ft^2$, 16.25 $lb/100$ $ft^2$, 16.5 $lb/100$ $ft^2$, 16.75 $lb/100$ $ft^2$, 17.0 $lb/100$ $ft^2$, 17.25 $lb/100$ $ft^2$, 17.5 $lb/100$ $ft^2$, 17.75 $lb/100$ $ft^2$, 18.0 $lb/100$ $ft^2$, 18.25 $lb/100$ $ft^2$, 18.5 $lb/100$ $ft^2$, 18.75 $lb/100$ $ft^2$, 19.0 $lb/100$ $ft^2$, 19.25 $lb/100$ $ft^2$, 19.5 $lb/100$ $ft^2$, 19.75 $lb/100$ $ft^2$, 20.0 $lb/100$ $ft^2$, 20.25 $lb/100$ $ft^2$, 20.5 $lb/100$ $ft^2$, 20.75 $lb/100$ $ft^2$, 21.0 $lb/100$ $ft^2$, 21.25 $lb/100$ $ft^2$, 21.5 $lb/100$ $ft^2$, 21.75 $lb/100$ $ft^2$, 22.0 $lb/100$ $ft^2$, 22.25 $lb/100$ $ft^2$, 22.5 $lb/100$ $ft^2$, 22.75 $lb/100$ $ft^2$, 23.0 $lb/100$ $ft^2$, 23.25 $lb/100$ $ft^2$, 23.5 $lb/100$ $ft^2$, 23.75 $lb/100$ $ft^2$, 24.0 $lb/100$ $ft^2$, 24.25 $lb/100$ $ft^2$, 24.5 $lb/100$ $ft^2$, 24.75 $lb/100$ $ft^2$, or 25.0 $lb/100$ $ft^2$, when measured within the temperature range of 90 to 120° F. The 10-second gel strength may be measured at, for example, 90° F., 91° F., 92° F., 93° F., 94° F., 95° F., 96° F., 97° F., 98° F., 99° F., 100° F., 101° F., 102° F., 103° F., 104° F., 105° F., 106° F., 107° F., 108° F., 109° F., 110° F., 111° F., 112° F., 113° F., 114° F., 115° F., 116° F., 117° F., 118° F., 119° F., or 120° F. In some embodiments, the well cement slurry has a 10-second gel strength of 19 $lb/100$ $ft^2$, when measured at 110° F.

In some embodiments, the well cement slurry has a 10-minute gel strength ranging from 15 to 35 $lb/100$ $ft^2$ when measured within the temperature range of 90 to 120° F. For example, the well cement slurry may have a 10-minute gel strength of 15.0 $lb/100$ $ft^2$, 15.25 $lb/100$ $ft^2$, 15.5 $lb/100$ $ft^2$, 15.75 $lb/100$ $ft^2$, 16.0 $lb/100$ $ft^2$, 16.25 $lb/100$ $ft^2$, 16.5 $lb/100$ $ft^2$, 16.75 $lb/100$ $ft^2$, 17.0 $lb/100$ $ft^2$, 17.25 $lb/100$ $ft^2$, 17.5 $lb/100$ $ft^2$, 17.75 $lb/100$ $ft^2$, 18.0 $lb/100$ $ft^2$, 18.25 $lb/100$ $ft^2$, 18.5 $lb/100$ $ft^2$, 18.75 $lb/100$ $ft^2$, 19.0 $lb/100$ $ft^2$, 19.25 $lb/100$ $ft^2$, 19.5 $lb/100$ $ft^2$, 19.75 $lb/100$ $ft^2$, 20.0 $lb/100$ $ft^2$, 20.25 $lb/100$ $ft^2$, 20.5 $lb/100$ $ft^2$, 20.75 $lb/100$ $ft^2$, 21.0 $lb/100$ $ft^2$, 21.25 $lb/100$ $ft^2$, 21.5 $lb/100$ $ft^2$, 21.75 $lb/100$ $ft^2$, 22.0 $lb/100$ $ft^2$, 22.25 $lb/100$ $ft^2$, 22.5 $lb/100$ $ft^2$, 22.75 $lb/100$ $ft^2$, 23.0 $lb/100$ $ft^2$, 23.25 $lb/100$ $ft^2$, 23.5 $lb/100$ $ft^2$, 23.75 $lb/100$ $ft^2$, 24.0 $lb/100$ $ft^2$, 24.25 $lb/100$ $ft^2$, 24.5 $lb/100$ $ft^2$, 24.75 $lb/100$ $ft^2$, 25.0 $lb/100$ $ft^2$, 26.0 $lb/100$ $ft^2$, 26.25 $lb/100$ $ft^2$, 26.5 $lb/100$ $ft^2$, 26.75 $lb/100$ $ft^2$, 27.0 $lb/100$ $ft^2$, 27.25 $lb/100$ $ft^2$, 27.5 $lb/100$ $ft^2$, 27.75 $lb/100$ $ft^2$, 28.0 $lb/100$ $ft^2$, 28.25 $lb/100$ $ft^2$, 28.5 $lb/100$ $ft^2$, 28.75 $lb/100$ $ft^2$, 29.0 $lb/100$ $ft^2$, 29.25 $lb/100$ $ft^2$, 29.5 $lb/100$ $ft^2$, 29.75 $lb/100$ $ft^2$, 30.0 $lb/100$ $ft^2$, 30.25 $lb/100$ $ft^2$, 30.5 $lb/100$ $ft^2$, 30.75 $lb/100$ $ft^2$, 31.0 $lb/100$ $ft^2$, 31.25 $lb/100$ $ft^2$, 31.5 $lb/100$ $ft^2$, 31.75 $lb/100$ $ft^2$, 32.0 $lb/100$ $ft^2$, 32.25 $lb/100$ $ft^2$, 32.5 $lb/100$ $ft^2$, 32.75 $lb/100$ $ft^2$, 33.0 $lb/100$ $ft^2$, 33.25 $lb/100$ $ft^2$, 33.5 $lb/100$ $ft^2$, 33.75 $lb/100$ $ft^2$, 34.0 $lb/100$ $ft^2$, 34.25 $lb/100$ $ft^2$, 34.5 $lb/100$ $ft^2$, 34.75 $lb/100$ $ft^2$, or 35.0 $lb/100$ $ft^2$ when measured within the temperature range of 90 to 120° F. The 10-second gel strength may be measured at, for example, 90° F., 91° F., 92° F., 93° F., 94° F., 95° F., 96° F., 97° F., 98° F., 99° F., 100° F., 101° F., 102° F., 103° F., 104° F., 105° F., 106° F., 107° F., 108° F., 109° F., 110° F., 111° F., 112° F., 113° F., 114° F., 115° F., 116° F., 117° F., 118° F., 119° F., or 120° F.

In some embodiments, the cured wellbore cement sheath has a compressive strength in its cured form ranging from 1100 to 1900 psi. For example, the cured wellbore cement sheath may have a compressive strength of 1125 psi, 1150 psi, 1175 psi, 1200 psi, 1225 psi, 1250 psi, 1275 psi, 1300 psi, 1325 psi, 1350 psi, 1375 psi, 1400 psi, 1425 psi, 1450 psi, 1475 psi, 1500 psi, 1525 psi, 1550 psi, 1575 psi, 1600 psi, 1625 psi, 1650 psi, 1675 psi, 1700 psi, 1725 psi, 1750 psi, 1775 psi, 1800 psi, 1825 psi, 1850 psi, 1875 psi, or 1900 psi. In some embodiments, the cured wellbore cement sheath has a compressive strength of 1204 psi. In some embodiments, the cured wellbore cement sheath has a compressive strength of 1653 psi. In some embodiments, the cured wellbore cement sheath has a compressive strength of 1697 psi. In some embodiments, the cured wellbore cement sheath e has a compressive strength of 1813 psi.

In some embodiments, the wellbore has a temperature in a range of 50 to 300° C. For example, the wellbore can have a temperature of 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., or 300° C.

In some embodiments, the wellbore has a pressure ranging from 0.1 to 20 MPa. For example, the wellbore can have a pressure of 0.1 MPa, 0.25 MPa, 0.5 MPa, 0.75 MPa, 1.0 MPa, 1.25 MPa, 1.5 MPa, 1.75 MPa, 2.0 MPa, 2.25 MPa, 2.5 MPa, 2.75 MPa, 3.0 MPa, 3.25 MPa, 3.5 MPa, 3.75 MPa, 4.0 MPa, 4.25 MPa, 4.5 MPa, 4.75 MPa, 5.0 MPa, 5.25 MPa, 5.5 MPa, 5.75 MPa, 6.0 MPa, 6.25 MPa, 6.5 MPa, 6.75 MPa, 7.0 MPa, 7.25 MPa, 7.5 MPa, 7.75 MPa, 8.0 MPa, 8.25 MPa, 8.5 MPa, 8.75 MPa, 9.0 MPa, 9.25 MPa, 9.5 MPa, 9.75 MPa, 10.0 MPa, 10.25 MPa, 10.5 MPa, 10.75 MPa, 11.0 MPa, 11.25 MPa, 11.5 MPa, 11.75 MPa, 12.0 MPa, 12.25 MPa, 12.5 MPa, 12.75 MPa, 13.0 MPa, 13.25 MPa, 13.5 MPa, 13.75 MPa, 14.0 MPa, 14.25 MPa, 14.5 MPa, 14.75 MPa, 15.0 MPa, 15.25 MPa, 15.5 MPa, 15.75 MPa, 16.0 MPa, 16.25 MPa, 16.5 MPa, 16.75 MPa, 17.0 MPa, 17.25 MPa, 17.5 MPa, 17.75 MPa, 18.0 MPa, 18.25 MPa, 18.5 MPa, 18.75 MPa, 19.0 MPa, 19.25 MPa, 19.5 MPa, 19.75 MPa, or 20.0 MPa, In some embodiments, the well cement slurry is applied to a surface of the wellbore to form a cured wellbore cement sheath covering a subterranean geological formation. In some embodiments, the wellbore is at least one selected from the group consisting of a horizontal wellbore, a vertical wellbore, a geothermal wellbore, an oil wellbore, a natural gas wellbore, a gas injection wellbore, a water injection wellbore, an aquifer production wellbore, a multi-lateral wellbore, a deviated wellbore, a directional wellbore, a deepwater wellbore, a shallow water wellbore, a coalbed methane wellbore, a production wellbore, an exploration wellbore, a monitoring wellbore, an offshore wellbore, an onshore wellbore, a tight gas wellbore, a fractured wellbore, a horizontal directional drilling (HDD) wellbore, an enhanced oil recovery (EOR) wellbore, a steam-assisted gravity drainage (SAGD) wellbore, a hydraulic fracturing wellbore, a saltwater disposal wellbore, a thermal recovery wellbore, a shale gas wellbore, and a carbon capture and storage (CCS) wellbore.

EXAMPLES

The following examples demonstrate method of cementing a portion of a wellbore. The examples are provided solely for illustration and are not to be construed as limitations of the present disclosure, as many variations thereof are possible without departing from the spirit and scope of the present disclosure.

Example 1: Materials and Methodology

The cement samples examined in accordance with the present disclosure, were prepared as a mixer of a plurality of components including class G cement, red mud, viscosifier, and fluid loss additive. The red mud used in the present disclosure was provided by Maaden, and the other additives were supplied by TAQA. The red mud used herein has an average particle size (D50) of 5.43 μm, as illustrated in the particle size distribution of FIG. 1. The elemental composition of the red mud is characterized by X-ray fluorescence (XRF) analysis, as listed in Table 1.

TABLE 1

| Composition of the red mud | | | | | | | |
|---|---|---|---|---|---|---|---|
| Component | $Al_2O_3$ | $Fe_2O_3$ | $SiO_2$ | $TiO_2$ | CaO | $Na_2O$ | $SO_3$ |
| Content (%) | 25.6 | 30.7 | 15.2 | 6.9 | 5.6 | 13.6 | 1.3 |

All cement samples prepared in the present disclosure had a slurry density of about 101 pounds per cubic feet (lb/ft³). Parameter including, but not limited to, compressive strength, rheology, and fluid loss of the cement samples were in accordance with the requirement for real-world field applications. The compressive strength was evaluated at the bottomhole static temperature (BHST) of 125° F. and other tests were performed at the bottomhole circulation temperature (BHCT) of 105° F., in order to simulate the downhole conditions for cementing a surface casing set, at a depth of 2000 feet (ft).

Example 2: Characterization Results

Figure 2A:
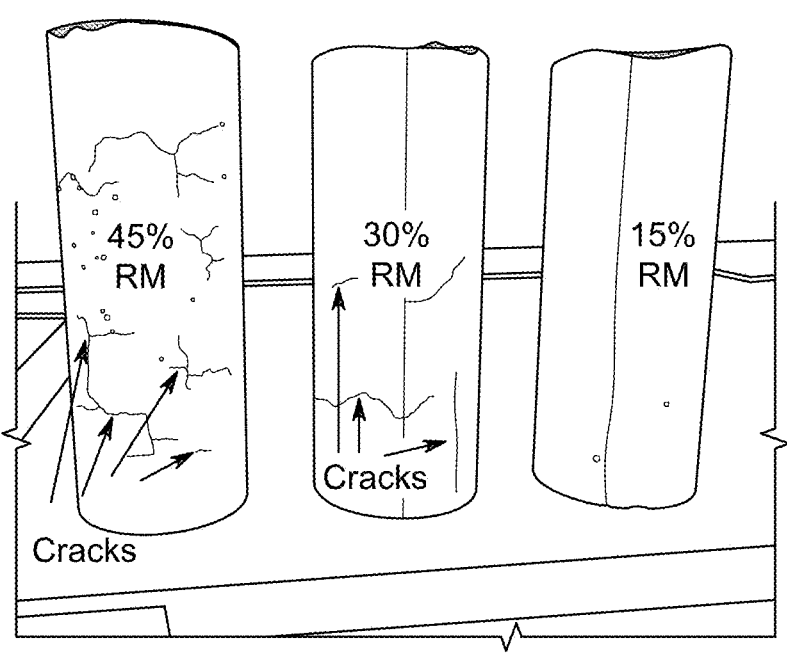
FIGS. 2A-2B illustrate the effect of increasing red mud concentration from 15% to 45% on the integrity of a cement matrix, according to certain embodiments.
Figure 2B:
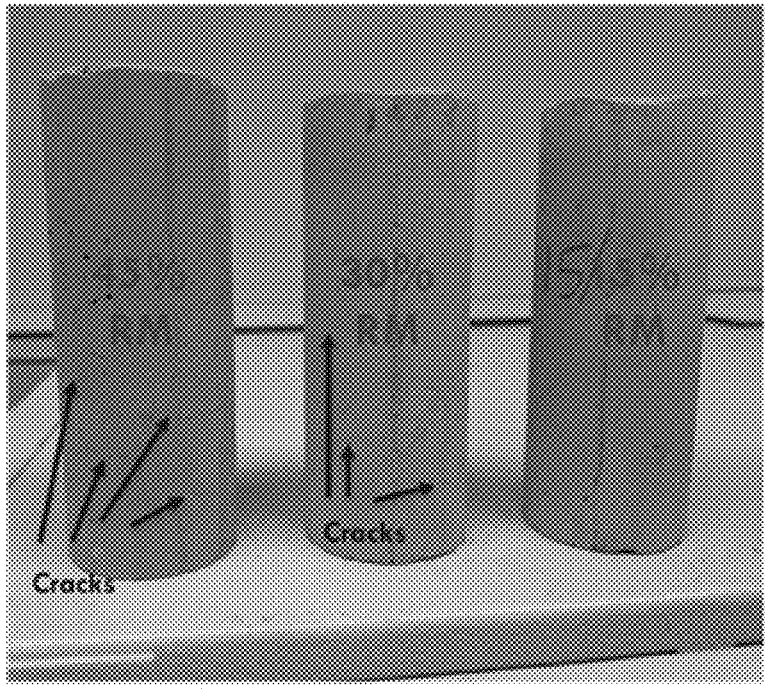
Figures 3A, 3B:
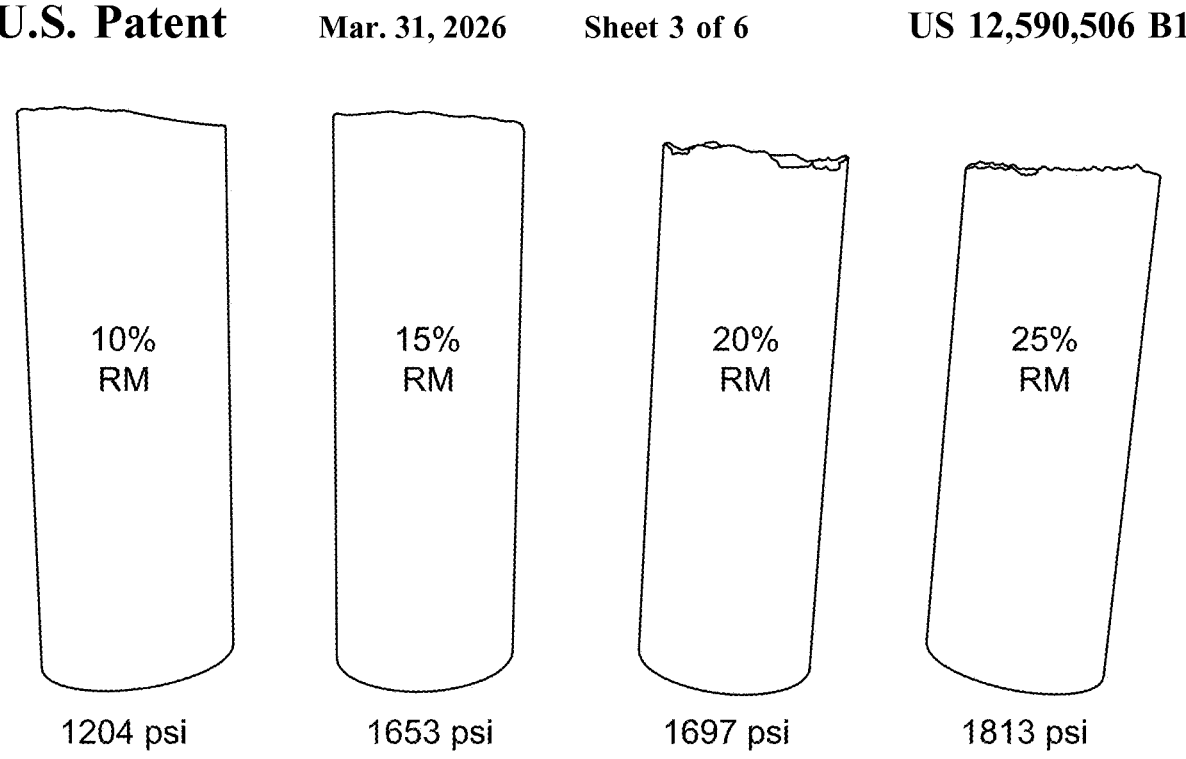
FIGS. 3A-3B illustrate the effect of increasing the red mud concentration from 10% to 25% on the integrity and compressive strength of the cement matrix, according to certain embodiments.

The effect of red mud concentration on cement integrity and compressive strength was examined to determine the maximum feasible replacement of class G cement with red mud. As shown in FIGS. 2A-2B, the use of 30% or more red mud in place of class G cement may lead to formation of a cement matrix characterized by microcracks. Hence, higher concentrations of red mud (more than 30%) were evaluated, as depicted in FIGS. 2A-2B. The results showed that the samples were free of microcracks. However, it was noted during mixing that using more than 15% red mud led to the formation of a thick slurry, which may be challenging for preparation and mixing procedures. Further, as can be seen from FIGS. 3A-3B, all samples exhibited high compressive strength, with values exceeding 700 pascals per square inch (psi) after 24 hours of curing, which meets the recommended minimum requirements, in accordance with the industry standards. Hence, use of 15% red mud may be considered as the maximum concentration. All other properties may be adjusted using the maximum concentration, along with the incorporation of additional chemical additives, as discussed in the subsequent paragraph(s).

Figure 4:
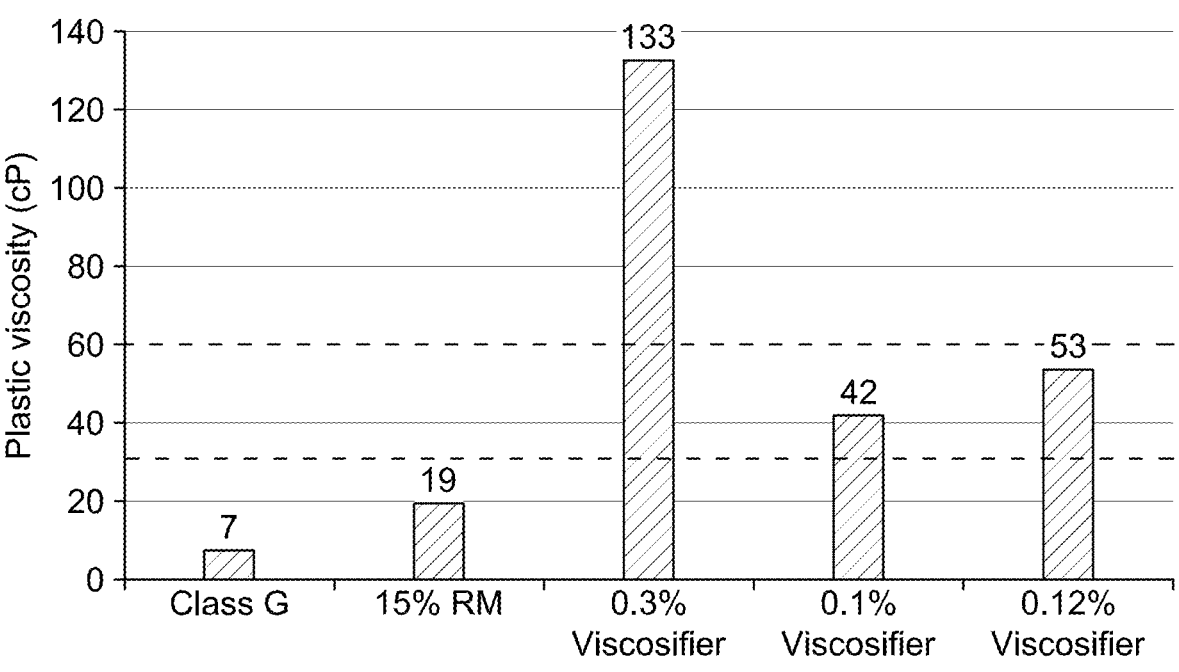
FIG. 4 is a graph depicting the variation in plastic viscosity of cement slurry with respect to various additives used in the cement slurry, at a bottom hole circulating temperature (BHCT) of 105° F., according to certain embodiments.

Furthermore, a plurality of rheological properties of the cement slurries were evaluated in order to adjust the plurality of rheological properties of the cement slurries, with respect to the maximum concentration of red mud. In some examples, the evaluations were conducted at BHCT of 105° F. It may be noted that according to industry requirements, the recommended plastic viscosity may not exceed 300 centipoise (cP), with the exact value depending on an area of application of the cement slurry. In certain implementations of the present disclosure, the slurry with a density of 101 lb/ft³ prepared for surface casing cementing had viscosity values ranging from about 30 cP to 55 cP. The plastic viscosity of the cement slurry is a vital parameter for adjusting slurry properties. The cement slurry prepared with class G cement exhibited a low plastic viscosity of 7 cP, which was below the recommended range, as shown in FIG. 4. For the sample including 15% red mud (RM), the plastic viscosity increased to 19 cP, however still remained below the minimum recommended value of 30 cP. Further, addition of the viscosifier increased the plastic viscosity, as shown in FIG. 4. The samples with 0.1% and 0.12% viscosifier showed a plastic viscosity of 42 cP and 53 cP, respectively, which are within the recommended range of the plastic viscosity.

Figure 5:
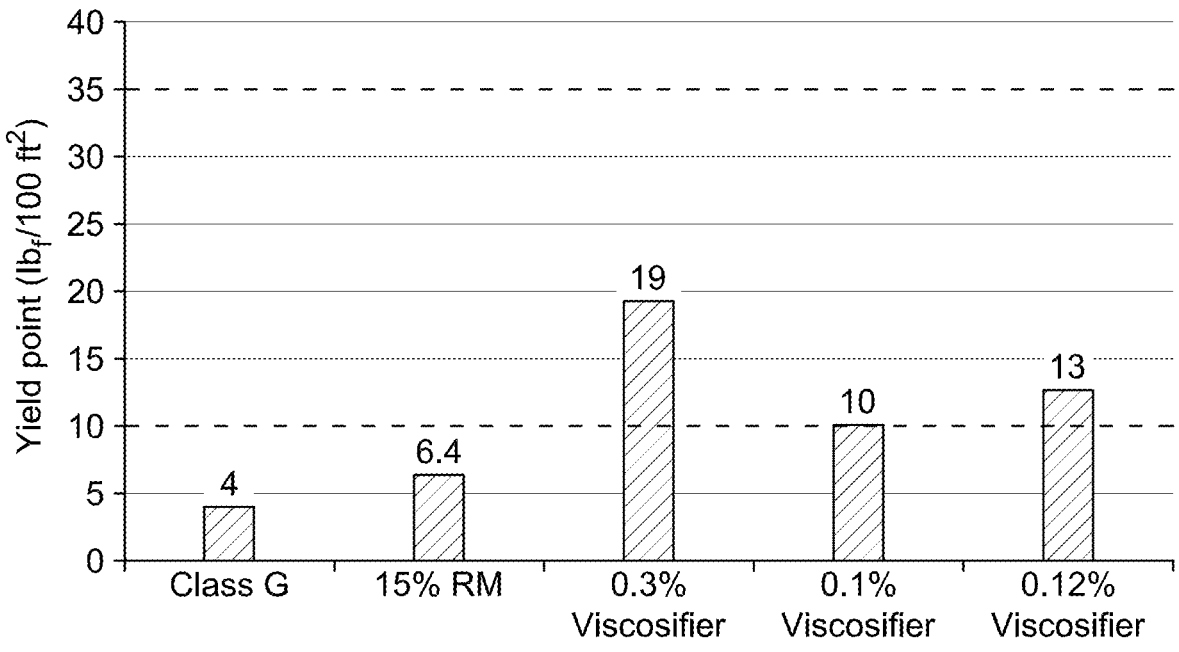
FIG. 5 is a graph depicting the variation in yield point (lb$_f$/100 ft$^2$) of cement slurry with respect to various additives used in the cement slurry, at the BHCT of 105° F., according to certain embodiments.

In addition, the second rheological property is the yield point. For the cement slurry with 101 lb/ft³, prepared for cementing the surface case, the yield point values ranged from about 10 lb/100 ft² to 35 lb/100 ft². All samples prepared with the viscosifier had yield point values within the recommended range, as shown in FIG. 5.

Figure 6A:
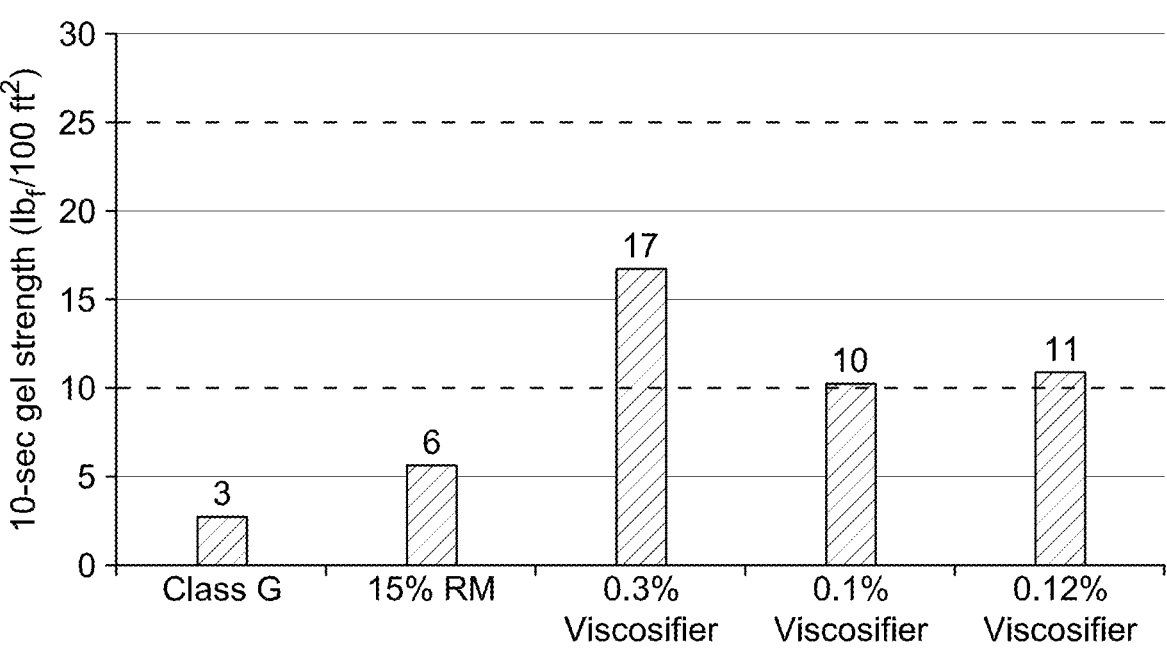
FIG. 6A is a graph depicting the variation in a 10 second gel strength of the cement slurry with respect to various additives used in the cement slurry, at a BHCT of 105° F., according to certain embodiments.
Figure 6B:
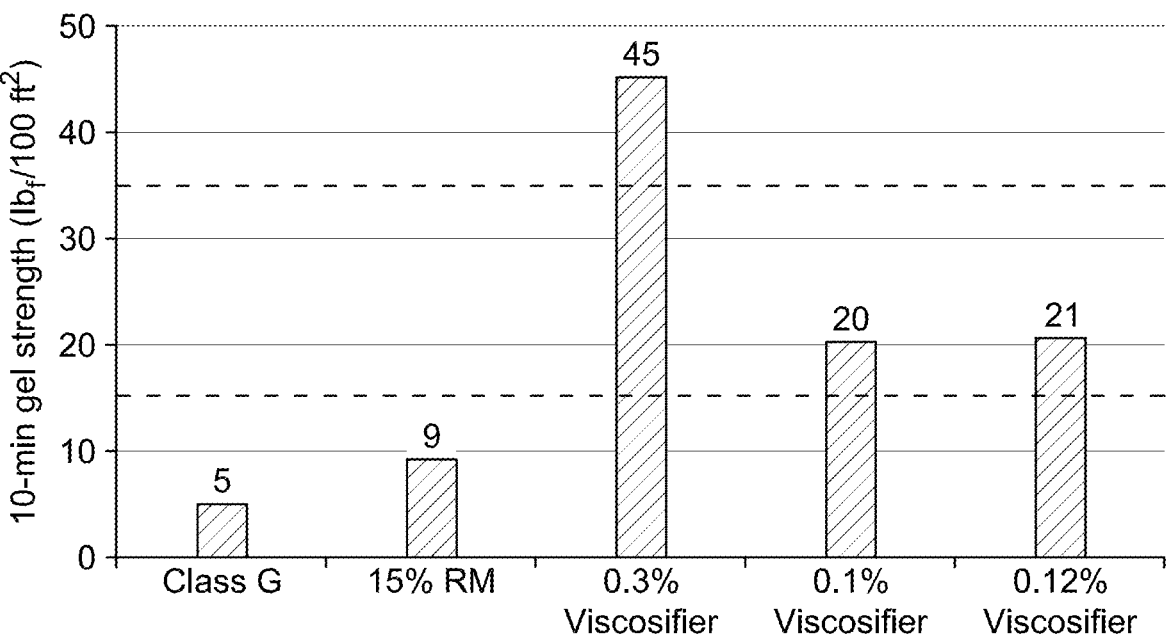
FIG. 6B is a graph depicting the variation in a 10 minute gel strength of the cement slurry with respect to various additives used in the cement slurry, at a BHCT of 105° F., according to certain embodiments.

The gel strength of the cement slurries was evaluated, including both 10-second and 10-minute gel strength. The samples with 0.1% and 0.12% viscosifier exhibited 10-second and 10-minute gel strength values that were within the recommended range, as shown in FIG. 6. Based on prior analysis, it may be concluded that the desirable concentration of the viscosifier is about 0.12%, as at 0.12%, the viscosifier enhanced all rheological properties.

Figure 7:
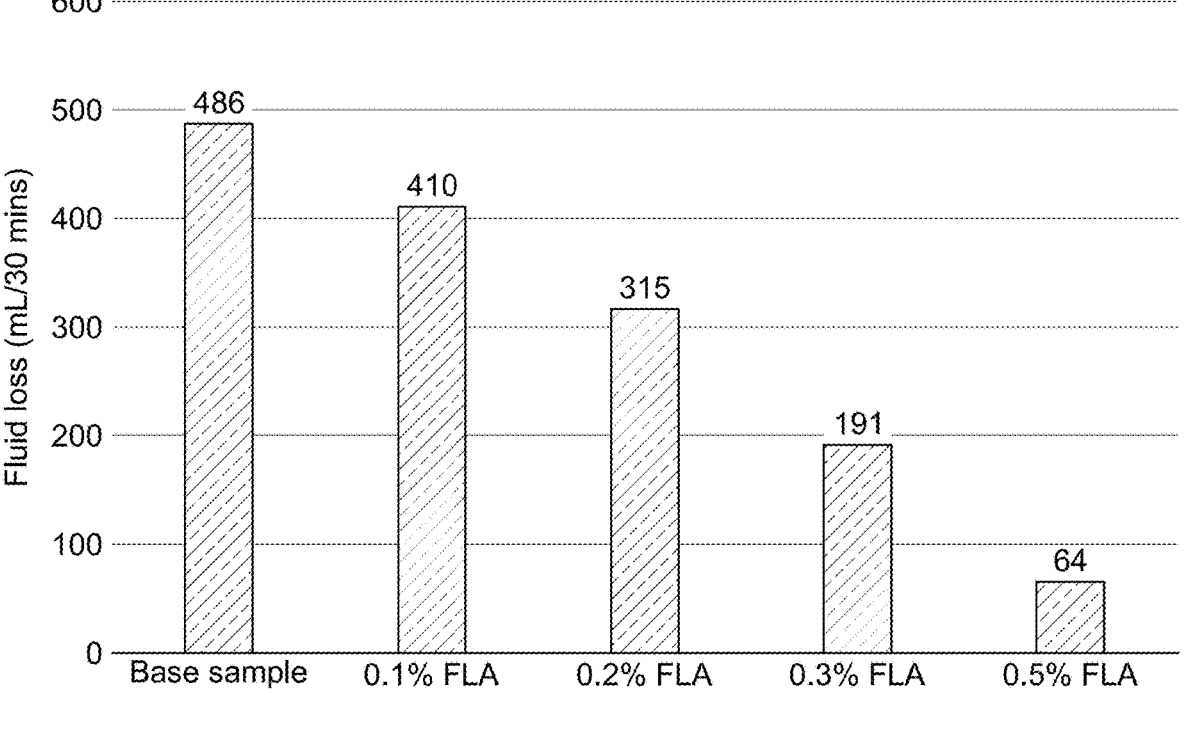
FIG. 7 is a graph depicting an effect of various concentration of a fluid loss additive (FLA), on the filtration properties of a 101 lb/ft$^3$ cement slurry, according to certain embodiments.

Further, the effect of replacing class G cement with 15% red mud (RM) and incorporating a plurality of concentration of a fluid loss additive on the slurry properties was evaluated, and in particular, free water and fluid loss properties were evaluated. The samples were prepared by substituting 15% of class G cement with red mud. The impact of the fluid loss additive on filtration properties is illustrated in FIG. 7, where the fluid loss is successfully reduced to about 64 milliliters per 30 minutes with the addition of 0.5% fluid loss additive (FLA) to the slurry. A similar result was observed for the sample containing 0.5% CFL-4, as shown in FIG. 7.

The cement mixture of the present disclosure may be useful as an environmentally sustainable and economically feasible alternative in the oil and gas industry and/or may provide a useful mechanism or procedure for disposing of or recycling red mud waste. The methods of the present disclosure may be advantageous to improve cementing practices in extreme environment while promoting sustainable or environmentally friendly industrial activity.

Numerous modifications and variations of the present disclosure are possible in light of the above teachings. It is therefore to be understood that within the scope of the appended claims, the invention may be practiced otherwise than as specifically described herein.

The invention claimed is:

1. A method of cementing a portion of a wellbore, the method comprising:

introducing a well cement slurry into the portion of the wellbore, the well cement slurry comprising:

a hydraulic cement;

red mud present in an amount of 2.5 to 50% by weight of the hydraulic cement (% BWOC);

a viscosifier;

a fluid loss additive; and water, and allowing the well cement slurry to cure against a wall of the wellbore thereby forming a cemented wellbore coated with a cured wellbore cement sheath, wherein the fluid loss additive is present in the well cement slurry in an amount of 0.4 to 0.6% BWOC, and wherein the well cement slurry has a fluid loss of 10 to 100 mL/30 min.

2. The method of claim 1, wherein the red mud comprises 19 to 51 wt. % iron oxide, 15 to 30 wt. % aluminum oxide, 4 to 20 wt. % silica, titanium dioxide, calcium oxide, and sodium oxide.

3. The method of claim 1, wherein the red mud is present in the well cement slurry in an amount of 5 to 30% BWOC.

4. The method of claim 1, wherein the red mud is present in the well cement slurry in an amount of 12.5 to 17.5% BWOC.

5. The method of claim 1, wherein the red mud has an average particle size ($D_{50}$) of 1 to 7.5 μm.

6. The method of claim 1, wherein the red mud has a particle size distribution having a first modal size of 5 to 10 μm; and a second modal size of 15 to 25 μm.

7. The method of claim 1, wherein the viscosifier is present in the well cement slurry in an amount of 0.05 to 1.0% BWOC.

8. The method of claim 1, wherein the viscosifier is present in the well cement slurry in an amount of 0.1 to 0.15% BWOC.

9. The method of claim 1, wherein the hydraulic cement is selected from the group consisting of an API class A Portland cement, an API class G Portland cement, an API class H Portland cement, and a Saudi class G hydraulic cement.

10. The method of claim 1, wherein the hydraulic cement is Saudi class G cement.

11. The method of claim 1, wherein, the well cement slurry has a density of 95 to 120 pounds per cubic foot (lb/ft$^3$).

12. The method of claim 1, wherein the well cement slurry has a fluid loss of 10 to 75 mL/30 min; and a plastic viscosity of 30 to 60 cP.

13. The method of claim 1, wherein the well cement slurry has a 10-second gel strength of 10 to 25 lb/100 ft$^2$; and a 10-minute gel strength of 15 to 35 lb/100 ft$^2$, each measured at 90 to 120° F.

14. The method of claim 1, wherein the cured wellbore cement sheath has a compressive strength in cured form of 1100 to 1900 psi.

15. The method of claim 1, wherein the wellbore has a temperature in a range of 50 to 300° C., and a pressure of 0.1 to 20 MPa.

16. The method of claim 1, wherein the well cement slurry is applied to a surface of the wellbore to form a cured wellbore cement sheath covering a subterranean geological formation.

17. The method of claim 1, wherein the wellbore is at least one selected from the group consisting of a horizontal wellbore, a vertical wellbore, and a multi-lateral wellbore.

18. The method of claim 1, wherein the wellbore is at least one selected from the group consisting of a geothermal wellbore, an oil wellbore, a natural gas wellbore, a gas injection wellbore, a water injection wellbore, and an aquifer production wellbore.

19. The method of claim 1, wherein the fluid loss additive is selected from the group consisting of guar gum, guar gum derivatives, welan gum, xanthan gum, poly (ethyleneimine), poly(2-acrylamido-2-methyl-1-propanesulfonic acid), cellulose, carboxymethyl hydroxyethyl cellulose, carboxymethyl cellulose, hydroxyethyl cellulose, and polystyrene sulfonate.

20. The method of claim 1, wherein the well cement slurry has a fluid loss of 64 mL/30 min.

\* \* \* \* \*